(12) United States Patent
Takeda (10) Patent No.: US 11,114,124 B2
(45) Date of Patent: Sep. 7, 2021

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Yoshihiko Takeda, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/562,980

(22) Filed: Sep. 6, 2019

(65) Prior Publication Data

US 2020/0294543 A1    Sep. 17, 2020

(30) Foreign Application Priority Data

Mar. 15, 2019    (JP) ............................. JP2019-048721

(51) Int. Cl.
*G11B 5/09* (2006.01)
*G11B 19/04* (2006.01)
*G06F 1/3234* (2019.01)
*G11B 5/012* (2006.01)

(52) U.S. Cl.
CPC .......... *G11B 19/041* (2013.01); *G06F 1/3268* (2013.01); *G11B 5/012* (2013.01)

(58) Field of Classification Search
None
See application file for complete search history.

(56) References Cited

U.S. PATENT DOCUMENTS

| | | | | |
|---|---|---|---|---|
| 6,144,628 A | * | 11/2000 | Matsuura | G11B 7/126 369/116 |
| 6,359,746 B1 | * | 3/2002 | Kakekado | G11B 5/54 360/75 |
| 7,551,383 B1 | * | 6/2009 | Kupferman | G11B 5/012 360/51 |
| 7,872,825 B2 | | 1/2011 | Sanghvi | |
| 7,933,086 B2 | | 4/2011 | Okita et al. | |
| 8,615,669 B1 | | 12/2013 | Hasko et al. | |
| 2007/0076492 A1 | * | 4/2007 | Arakawa | G11C 5/145 365/189.11 |
| 2010/0061008 A1 | | 3/2010 | Moritsugu et al. | |
| 2010/0321810 A1 | * | 12/2010 | Ueda | G11B 21/12 360/31 |

FOREIGN PATENT DOCUMENTS

| | | |
|---|---|---|
| JP | H05-11897 A | 1/1993 |
| JP | 2010-67294 A | 3/2010 |

\* cited by examiner

*Primary Examiner* — Peter Vincent Agustin
(74) *Attorney, Agent, or Firm* — White & Case LLP (57) ABSTRACT

According to one embodiment, a control device to be used for a magnetic disk device includes a power source control section and a control section. The power source control section configured to change an output voltage value of a voltage supplied to the control device from a power source on the basis of a voltage control parameter. The control section configured to, when a magnetic head makes access to a zone set on a magnetic disk, set a voltage control parameter provided in such a manner as to be correspondent to the zone to the power source control section.

3 Claims, 8 Drawing Sheets

| Mode | Zone | Frequency | Voltage control parameter (target DRO count) | Preceding setting time at the time of write/read continuous with zone 0 | Preceding setting time at the time of write/read continuous with zone 1 | Preceding setting time at the time of write/read continuous with zone 2 | Preceding setting time at the time of write/read continuous with zone 3 | Preceding setting time at the time of write/read continuous with zone 4 | Preceding setting time at the time of write/read continuous with zone 5 | Preceding setting time at the time of write/read continuous with zone 6 | Preceding setting time at the time of write/read continuous with zone 7 | Preceding setting time at the time of write/read continuous with zone 8 | Preceding setting time at the time of write/read continuous with zone 9 |
|---|---|---|---|---|---|---|---|---|---|---|---|---|---|
| Disk read/write | 0 | 3.4GHz | 8000 | - | 0 | 0 | 0 | 0 | 0 | 0 | 0 | 0 | 0 |
| | 1 | 3.3GHz | 7900 | 1 | - | 0 | 0 | 0 | 0 | 0 | 0 | 0 | 0 |
| | 2 | 3.2GHz | 7800 | 2 | 1 | - | 0 | 0 | 0 | 0 | 0 | 0 | 0 |
| | 3 | 3.1GHz | 7700 | 3 | 2 | 1 | - | 0 | 0 | 0 | 0 | 0 | 0 |
| | 4 | 3.0GHz | 7600 | 4 | 3 | 2 | 1 | - | 0 | 0 | 0 | 0 | 0 |
| | 5 | 2.9GHz | 7500 | 5 | 4 | 3 | 2 | 1 | - | 0 | 0 | 0 | 0 |
| | 6 | 2.8GHz | 7400 | 6 | 5 | 4 | 3 | 2 | 1 | - | 0 | 0 | 0 |
| | 7 | 2.7GHz | 7300 | 7 | 6 | 5 | 4 | 3 | 2 | 1 | - | 0 | 0 |
| | 8 | 2.6GHz | 7200 | 8 | 7 | 6 | 5 | 4 | 3 | 2 | 1 | - | 0 |
| | 9 | 2.5GHz | 7100 | 9 | 8 | 7 | 6 | 5 | 4 | 3 | 2 | 1 | - |
| Idle | - | | 7000 | - | - | - | - | - | - | - | - | - | - |

MAGNETIC DISK DEVICE

CROSS-REFERENCE TO RELATED APPLICATIONS

This application is based upon and claims the benefit of priority from Japanese Patent Application No. 2019-048721, filed Mar. 15, 2019, the entire contents of which are incorporated herein by reference.

FIELD

Embodiments described herein relate generally to a control device and magnetic disk device.

BACKGROUND

Regarding a magnetic disk device, as a technique for supplying electric power to a control device, a technique in which a plurality of external power supply units are prepared, and power supply to the control device is switched by hardware, or technique in which a plurality of voltage-dividing resistance circuits used to change the reference voltage are externally prepared, and power supply to the control device is switched by hardware is known.

Incidentally, in each of the techniques described above, addition of external circuits is required and, fine control on the level of several millivolts attributable to variations in component characteristics cannot be carried out.

Further, in recent years, in the magnetic disk device, the improvement in recording density and transfer rate is remarkable, and a magnetic disk device provided with a hardware-based code-correcting or error-correcting circuit for realizing such an improvement in recording density and transfer rate is proposed and realized. However, concomitantly with an increase in the leakage current incidental to the performance upgrade of the magnetic disk device or process shrink of System on Chip (Soc), an increase in the power consumption is becoming a problem. In addition to this, for example, in a storage system or the like in which a large number of magnetic disk devices are used, a demand for a magnetic disk device capable of a low power consumption operation is also becoming higher for the purpose of the global environment improvement.

Furthermore, in general, the core power source (VDD) voltage required of the Soc of a magnetic disk device is determined by the maximum transfer rate at the time of read and at the time of write of the disk. The maximum transfer rate at the time of read and at the time of write of the disk differs between the outer circumferential side and inner circumferential side of the disk, and hence the outer circumferential side of the disk requires a higher voltage of the core power source.

However, when the voltage of the core power source is set to be suited to the outer circumferential side requiring the higher voltage, an excessively high voltage is set at the time of disk read and disk write, and at the idle time in the low transfer rate area on the disk inner circumferential side which should originally require no higher voltage, this being a factor in the useless power consumption.

Embodiments described herein aim to provide a control device and magnetic disk device capable of appropriately setting a voltage of a power source.

DETAILED DESCRIPTION

In general, according to one embodiment, a magnetic disk device includes a power source control section and a control section. The power source control section configured to change an output voltage value of a voltage supplied to the control device from a power source on the basis of a voltage control parameter. The control section configured to, when a magnetic head makes access to a zone set on a magnetic disk, set a voltage control parameter provided in such a manner as to be correspondent to the zone to the power source control section.

Hereinafter, embodiments will be described with reference to the accompanying drawings. It should be noted that the disclosure has been presented by way of example only, and the contents described in the following embodiments are not intended to limit the scope of the invention. Modifications readily occur to those skilled in the art are naturally included in the scope of the disclosure. In order to make the description more definite, the size, shape, and the like of each section are schematically expressed in the drawings by changing them from the actual embodiment in some cases. In a plurality of drawings, corresponding elements are denoted by identical reference numbers, and detailed descriptions are omitted in some cases.

First Embodiment

Figure 1:
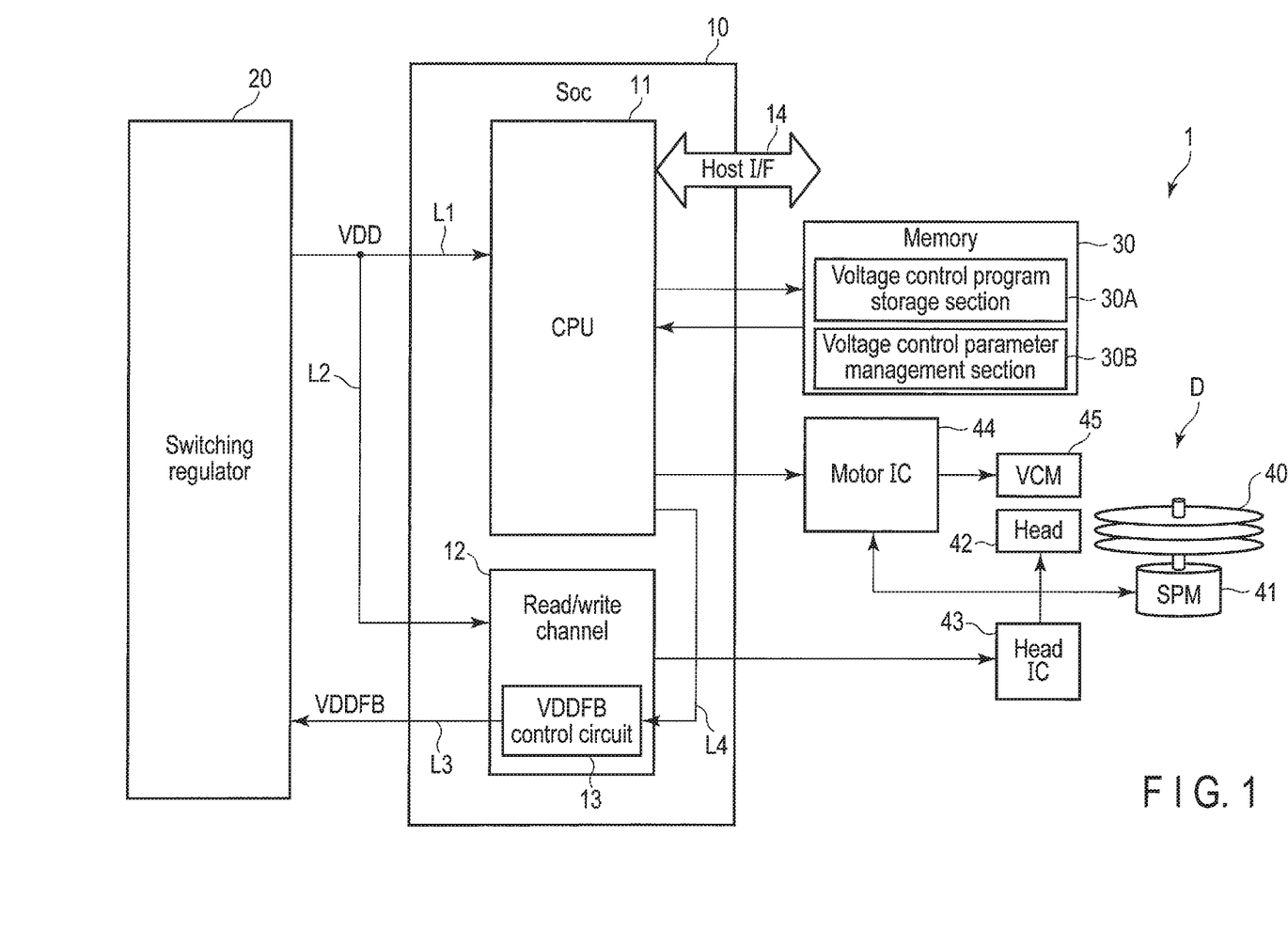
FIG. 1 is a view showing an example of the schematic configuration of a magnetic disk device according to a first embodiment.

FIG. 1 is a view showing an example of the schematic configuration of a magnetic disk device 1.

As shown in FIG. 1, the magnetic disk device 1 is provided with a System on Chip (Soc) 10, switching regulator 20, memory 30, and magnetic disk section D. The Soc 10 includes a CPU 11 serving as a control section and read/write channel 12 including a VDDFB control circuit 13 serving as a power source control section, and memory 30 includes a voltage control program storage section 30A and voltage control parameter management section 30B. The magnetic disk section D includes magnetic disks 40, spindle motor (hereinafter referred to as a "SPM") 41, magnetic head (hereinafter referred to as a "head") 42, head IC 43, motor IC 44, and voice coil motor (hereinafter referred to as a "VCM") 45.

The Soc 10 and switching regulator 20 are connected to each other by a line L1 and line L2 branched off from the line L1 and are further connected to each other by a line L3.

More specifically, the switching regulator 20 and Soc 10 are connected to each other by the line L1, and the switching regulator 20 and read/write channel 12 are connected to each other by the line L2 branched off from the line L1. The VDDFB control circuit 13 and switching regulator 20 are connected to each other by the line L3. Furthermore, the CPU 11 and read/write channel 12 are connected to each other by a line L4.

The Soc 10 is a member configured to control processing for the magnetic disk section D, and is constituted of the CPU 11, read/write channel 12, and the like which are incorporated into one chip.

The switching regulator 20 is constituted of, for example, an electronic circuit, and carries out control in such a manner as to keep a voltage to be output to the Soc 10 constant. That is, the switching regulator 20 carries out supply of the VDD voltage serving as the core power source to the CPU 11 and read/write channel 12 inside the Soc 10 through the line L1 and line L2. Further, the switching regulator 20 receives a feedback signal VDDFB from the VDDFB control circuit 13 through the line L3.

The CPU 11 is a main controller of the magnetic disk device 1, and executes control of a read/write operation for the magnetic disks 40 and servo control necessary for positioning of the head 42. For example, when the head 42 makes access (read/write) to a zone (to be described later) set on the magnetic disk 40, the CPU 11 sets a voltage control parameter (to be described later) to be provided in such a manner as to correspond to a zone to the VDDFB control circuit 13 through the line L4. Further, the CPU 11 operates by the VDD voltage supplied thereto from the switching regulator 20 through the line L1. It should be noted that the CPU 11 is configured to be able to communicate with a host (abbreviated in the figure) through a host interface (I/F) 14.

The read/write channel 12 is a signal processing circuit configured to process a signal relating to read/write. The read/write channel 12 includes a read channel configured to execute signal processing of read data and write channel configured to execute signal processing of write data. The read/write channel 12 converts a read signal into digital data, and demodulates read data from digital data. The read/write channel 12 encodes write data transferred thereto from a hard disk controller (abbreviated in the figure) and transfers the encoded write data to the head IC 43. The read/write channel 12 operates by the VDD voltage supplied thereto from the switching regulator 20 through the line L1.

The VDDFB control circuit 13 outputs, when the voltage control parameter is set thereto by the CPU 11, a VDDFB signal for changing the VDD voltage to the switching regulator 20 through the line L3. Thereby, the VDD voltage to be output from the switching regulator 20 is dynamically subjected to feedback control.

Regarding this feedback control, for example, a method or the like of carrying out control by monitoring of the count value of a Digital Ring Oscillator (DRO) counter is conceivable. In this method, a target DRO count for operating the read/write channel 12 at a certain frequency is set to the VDDFB control circuit 13 and, when the target DRO count is exceeded or is not reached, the signal VDDFB is dynamically controlled, whereby the VDD voltage is controlled to a VDD voltage appropriate for the frequency. In other words, the above control is control to be carried out by the VDDFB control circuit 13 in such a manner as to change the value of the voltage supplied from the switching regulator 20 to the Soc 10 on the basis of the target DRO count which is a voltage control parameter. It should be noted that besides there is, as the control method of the VDD voltage, a method in which the I2C interface or the like is utilized to directly change the setting of the voltage value of the switching regulator 20. In this embodiment, although the control utilizing the target DRO count as the voltage control parameter will be described, details thereof will be described later.

The memory 30 includes a volatile memory and nonvolatile memory. For example, the memory 30 includes a buffer memory constituted of a DRAM, and further includes a flash memory. The memory 30 stores therein programs and parameters necessary for the processing of the CPU 11. In this embodiment, further, in the memory 30, a voltage control program storage section 30A configured to store therein a voltage control program for controlling the VDD voltage, and voltage control parameter management section 30B configured to manage the voltage control parameter used in the power source control program are included. It should be noted that the voltage control program is constituted of, for example, firmware.

The magnetic disk 40 includes a substrate formed into, for example, a disk-like shape and constituted of a non-magnetic material. In each surface of the substrate, a soft magnetic layer constituted of a material exhibiting a soft magnetic property and serving as a foundation layer, magnetic recording layer having a magnetic anisotropy in the direction perpendicular to the disk surface and formed on the soft magnetic layer, and protective film layer formed on the magnetic recording layer are stacked one on top of the other in the order mentioned.

The magnetic disk 40 is fixed to the SPM 41 and is rotated by the SPM 41 at a predetermined rotational speed. It should be noted that the number of the magnetic disk 40 is not limited to one, and a plurality of magnetic disks 40 may be provided on the SPM 41. The SPM 41 is driven by a drive current (or a drive voltage) supplied thereto from the motor IC 44. On or from the magnetic disk 40, a data pattern is recorded or reproduced by the head 42.

On the VCM 45, an actuator having the head 42 at the apical end thereof is rotatably provided. The actuator is rotated by the VCM 45, whereby the head 42 is moved to a position on the desired track of the magnetic disk 40, and is positioned there. The VCM 45 is driven by a drive current (or a drive voltage) supplied thereto from the motor IC 44.

The head 42 includes a slider (abbreviated in the figure), write head (abbreviated in the figure) and read head (abbreviated in the figure) formed on the slider. A plurality of heads 42 are formed according to the number of the magnetic disks 40.

The head IC 43 supplies a write signal (write current) corresponding to the write data supplied thereto from the read/write channel 12 to the head 42. Further, the head IC 43 amplifies a read signal output from the head 42 and transmits the amplified read signal to the read/write channel 12.

Figure 2:
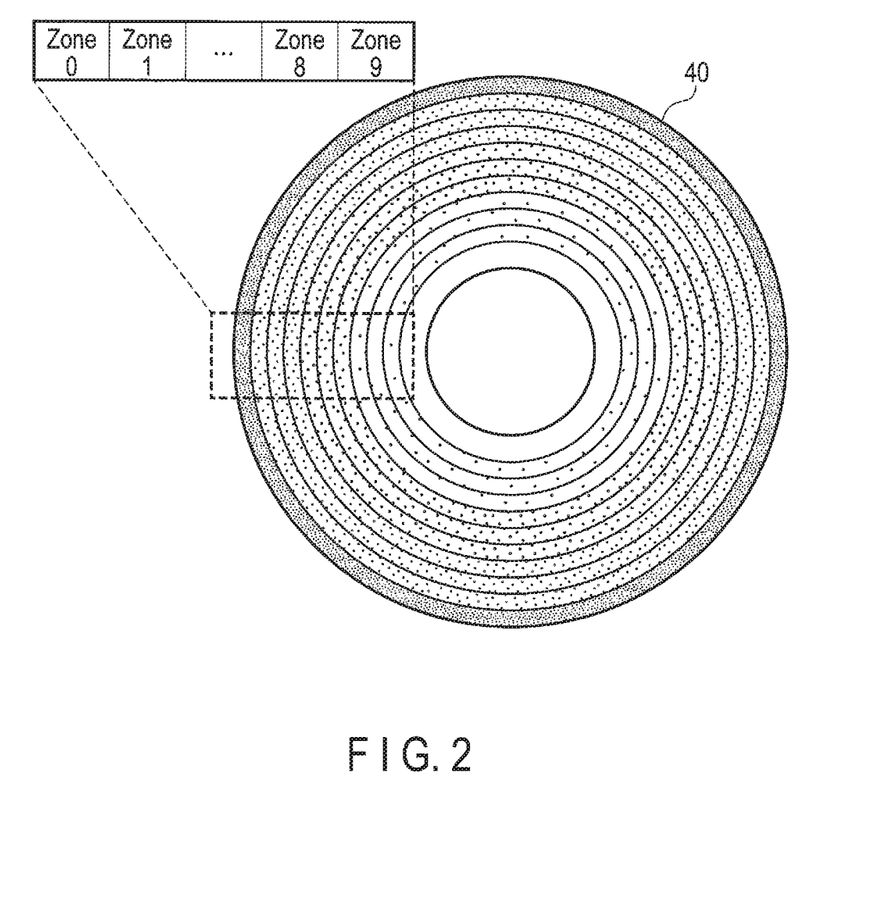
FIG. 2 is a view showing examples of zones set on the magnetic disk according to the first embodiment.

FIG. 2 is a view showing examples of zones set on the magnetic disk 40.

As shown in FIG. 2, ten zones 0 to 9 each having ring-like shapes are provided on the magnetic disk 40. It should be noted that the zone 0 is the outermost zone and zone 9 is the innermost zone. Each zone is formed of a plurality of tracks of an arbitrary number.

Figure 3:
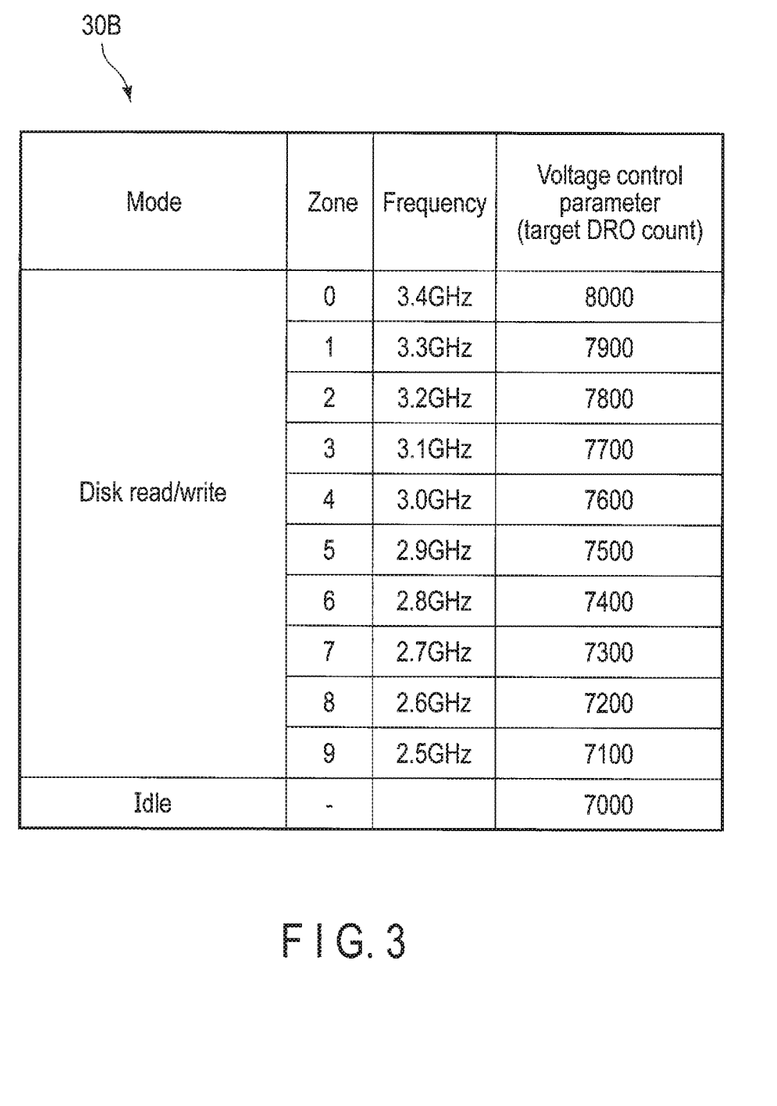
FIG. 3 is a view showing an example of a voltage control parameter management section according to the first embodiment.

FIG. 3 is a view showing an example of a voltage control parameter management section 30B.

As shown in FIG. 3, in the voltage control parameter management section 30B, items of mode, zone, frequency, and voltage control parameter (target DRO count) are provided. In the item of mode, two modes including a read/write mode of the magnetic disk 40 and idle mode are set. In the item of zone, the already-described zones 0 to 9 are set in such a manner as to correspond to the read/write mode. It should be noted that read/write is not carried out at the idle time, and hence zones are not set in the idle mode.

Regarding the frequency, a frequency at the time of read/write in each zone is set. At the idle time, read/write of data is not carried out, and hence frequencies are not set in the idle mode. The voltage control parameters (target DRO counts) are set in such a manner as to become less stepwise from the outer circumferential side (zone 0) of the magnetic disk 40 to the inner circumferential side (zone 9) thereof. It should be noted that hereinafter the voltage control parameter is called the target DRO count.

Next, the function of the case where data is read/written from/to the magnetic disk 40 when the voltage control parameter described above is managed by the voltage control parameter management section 30B will be described below with reference to FIG. 4 and FIG. 5.

Figure 4:
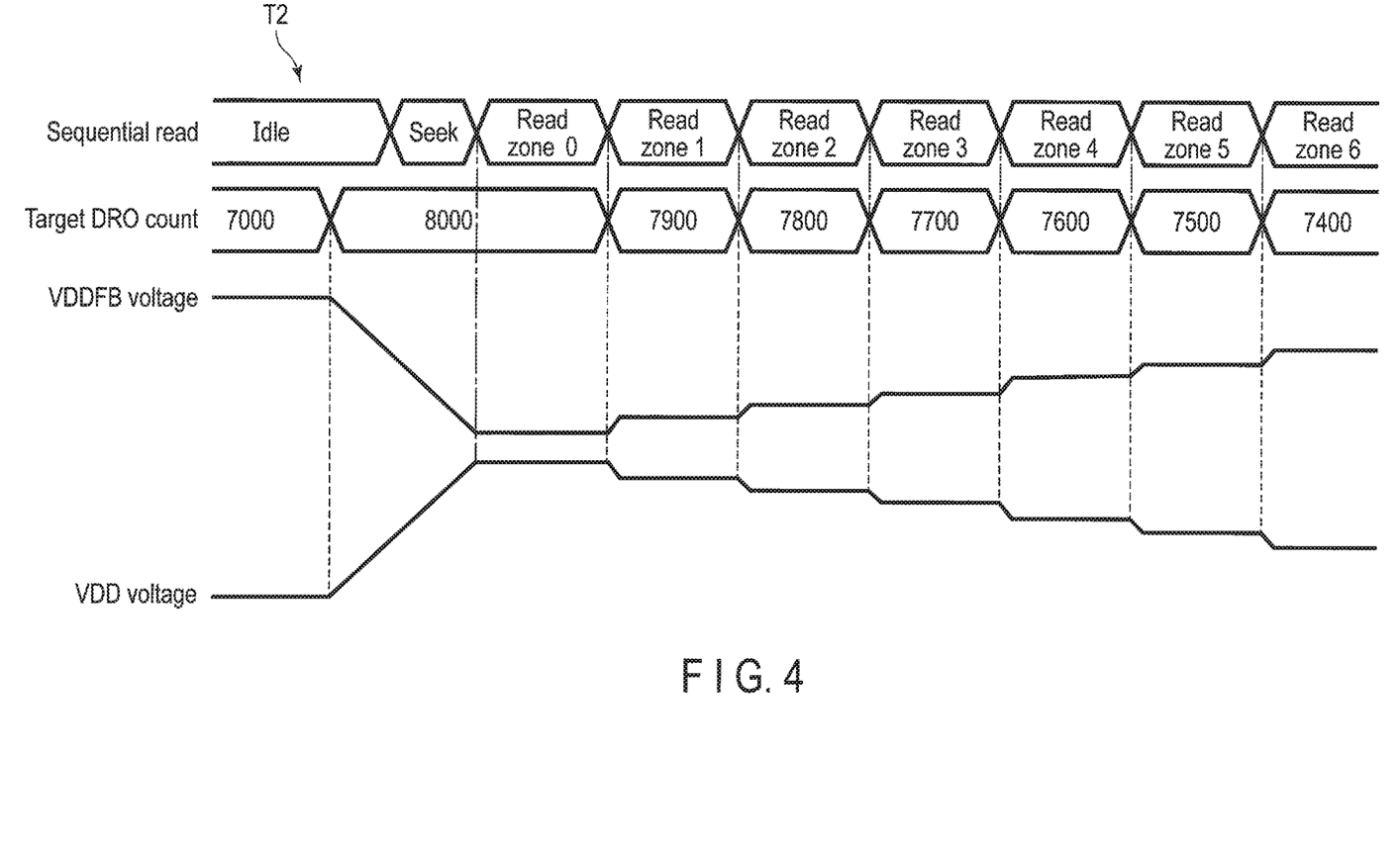
FIG. 4 is a view showing an example of a function of a case where data is sequentially read from zones set on the magnetic disk according to the first embodiment.

FIG. 4 is a view showing an example of a function of a case where data is sequentially read from zones 0 to 9 set on the magnetic disk 40. It should be noted that for convenience of illustration, only zones from 0 to 6 are shown. Further, the description of the function at the time when data is written is identical to the function at the time when data is read, and hence in this embodiment, a description will be given of the function at the time when data is read.

As shown in FIG. 4, there is an idle state and seek time and then, data of each zone is read in sequence from the zone 0. At this time, the target DRO count is 7000 in the idle state and, when data is read from the zone 0 in this state, the target DRO count is set to 8000. Regarding the target DRO count after this, target DRO counts corresponding to the zones are set in sequence in such a manner that the target DRO count is set to 7900 when the zone is switched from the zone 0 to the zone 1, and is set to 7800 when the zone is switched from the zone 1 to the zone 2. As described above, on the basis of the setting of the voltage control parameter management section 30B, the target DRO count to be set to the VDDFB control circuit 13 is changed each time the zone is switched from one to another. Next, a change in the VDD voltage and change in the VDDFB voltage in the case where the target DRO count is changed in sequence will be described below with reference to the VDD voltage and VDDFB voltage of FIG. 4. In general, in the voltage control of a switching regulator, a voltage obtained by dividing the output voltage (VDD in this embodiment) is returned to the switching regulator as a feedback signal. For this reason, the VDDFB voltage becomes a voltage lower than the VDD voltage. Accordingly, as shown in FIG. 4, when the VDDFB voltage lowers, it is determined that the voltage has lowered in the circuit inside the switching regulator 20, and the operation is carried out to raise the VDD voltage. Conversely, when the VDDFB voltage rises, it is determined that the voltage has risen in the circuit inside the switching regulator 20, and the operation is carried out to lower the VDD voltage.

When the magnetic disk 40 is subjected to sequential read/write, the Soc 10 configured in the manner described above previously reads the target DRO count of the next zone managed by the voltage control parameter management section 30B, and sets the target DRO count to the VDDFB control circuit 13 when the zone is shifted to the next zone. Thereby, setting of the VDD voltage necessary and sufficient for the zone from/to which data is read/written is carried out at the correct time, i.e., it is possible to set a non-excessive and necessary VDD voltage at the time of read/write, and hence it becomes possible to reduce the effective power consumption. Further, it is possible to carry out fine voltage control on the level of several millivolts attributable to variations in component characteristics.

Figure 5:
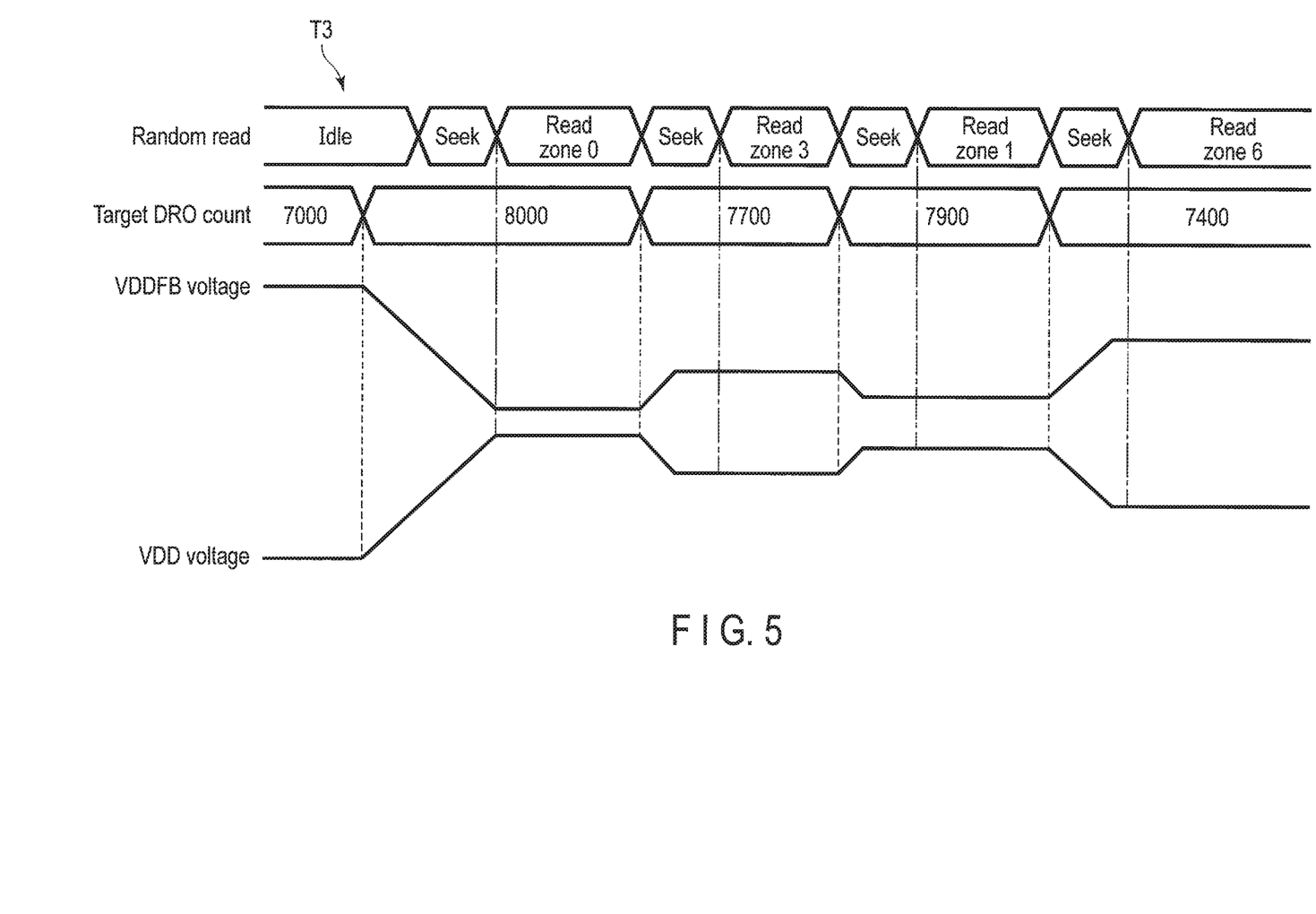
FIG. 5 is a view showing an example of a function of a case where data is read in a random manner from zones set on the magnetic disk according to the first embodiment.

FIG. 5 is a view showing an example of a function of a case where data is read in a random manner from zones set on the magnetic disk 40. It should be noted that the description of the function at the time when data is written is identical to the function at the time when data is read, and hence in this embodiment, a description will be given of the function at the time when data is read.

As shown in FIG. 5, in this embodiment, the case where data is read in a random manner from the zone 0, zone 3, zone 1, and zone 6 in the order mentioned is shown, and at the time of start of the seek operation to be carried out when the head 42 moves between zones, setting of the target DRO count is carried out on the basis of the setting of the voltage control parameter management section 30B. When data is read from the zone 0 starting from the idle state, the target DRO count is set to 8000 corresponding to the zone 0 before the head 42 enters the seek operation to be carried out in order that the head 42 may move to the zone 0. Then, the target DRO count is set to 7700 corresponding to the zone 3 while the seek operation is carried out in order that the zone from which data is read can be switched from the zone 0 to the zone 3. Subsequently, the target DRO count is set to 7900 corresponding to the zone 1 while the seek operation is carried out in order that the zone from which data is read can be switched from the zone 3 to the zone 1. Next, the target DRO count is set to 7400 corresponding to the zone 6 while the seek operation is carried out in order that the zone from which data is read can be switched from the zone 1 to the zone 6. In this manner, the target DRO count to be set to the VDDFB control circuit 13 is changed in sequence. Thereby, even when the voltage difference due to movement between zones is large, feedback is carried out during the seek operation so that an appropriate VDD voltage can be obtained.

When data is read/written from/to the magnetic disk 40 in a random manner, if the zone of the next access destination differs from the current zone, the Soc 10 configured as described above previously reads the target DRO count of the next zone managed by the voltage control parameter management section 30B, and sets the previously read target DRO count to the VDDFB control circuit 13 during the seek operation to be carried out when the head 42 moves to the next zone to thereby control the VDDFB voltage. Thereby, setting of the VDD voltage necessary and sufficient for the zone from/to which data is read/written is carried out at the correct time, i.e., it is possible to set a non-excessive and necessary VDD voltage at the time of read/write, and hence it becomes possible to reduce the effective power consumption. Further, it is possible to carry out fine voltage control on the level of several millivolts attributable to variations in component characteristics.

Further, when the CPU 11 reads/writes data in a random manner, the Soc 10 carries out feedback control of the VDD voltage using the target DRO count managed by the voltage control parameter management section 30B only during the seek operation, and hence it is possible to reduce the influence of the voltage variation, and make preparations in time for the next zone access (read/write).

Second Embodiment

Incidentally, when data is read/written from/to the magnetic disk 40 in a random manner, if there is a large difference between the target DRO counts of the current zone and next zone between which switching is carried out, for example, in a case or the like where the zone is switched from the outermost zone 0 to the innermost zone 9, a situation in which switchover of the VDD voltage to the target VDD is not in time for the seek operation for the next zone is conceivable. Particularly, in the case of the VDD voltage ascent, the VDD voltage becomes insufficient, and there is a possibility of the transfer rate of data becoming insufficient. In this embodiment, the case where the time necessary for voltage correction is calculated before read/write of the preceding zone is completed, and the target DRO count is set to the VDDFB control circuit 13 in advance by taking the necessary time into consideration will be described. It should be noted that configurations identical to the first embodiment described above are denoted by reference symbols identical to the first embodiment and detailed descriptions of these configurations are omitted.

Figure 6:
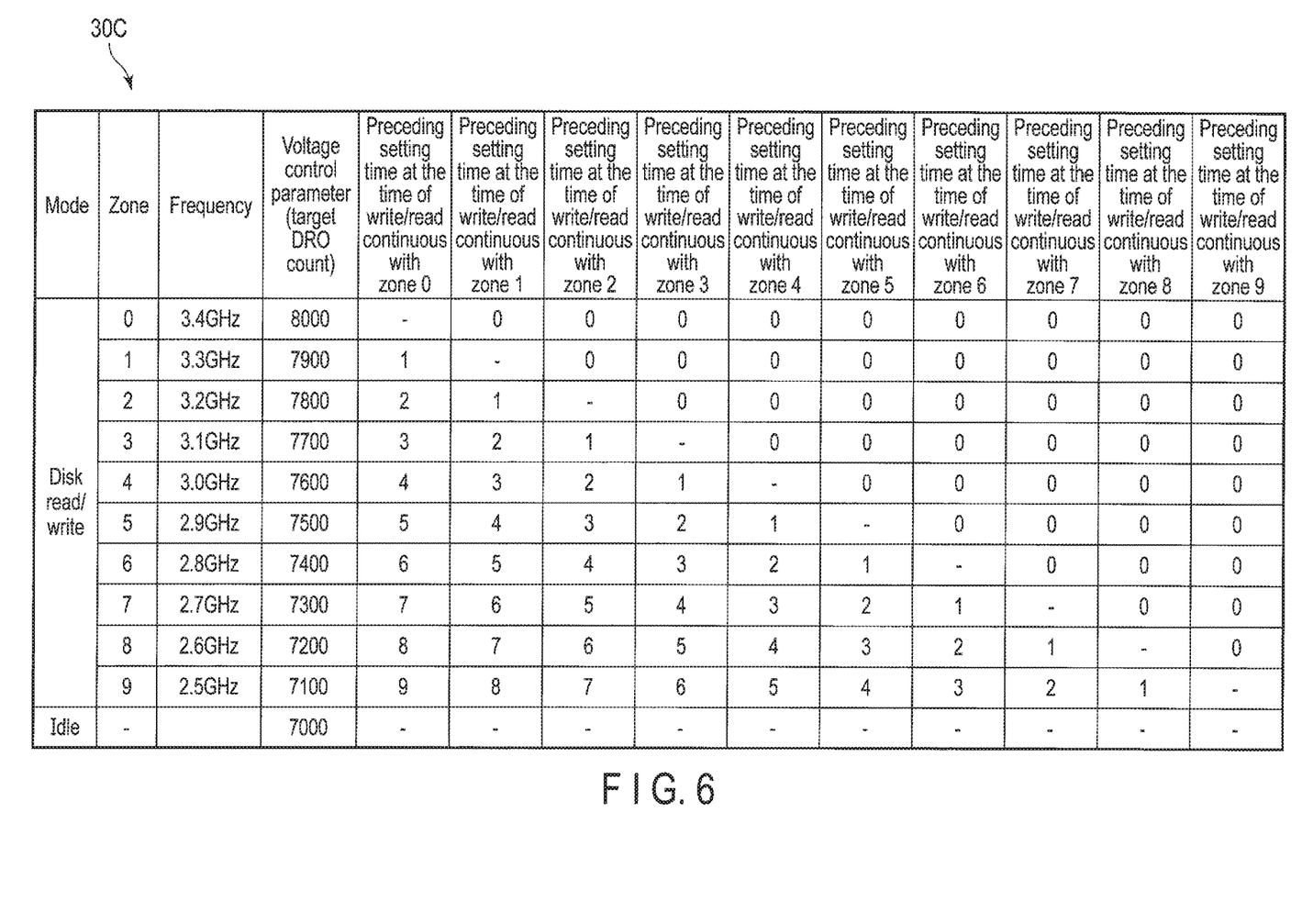
FIG. 6 is a view showing an example of a voltage control parameter management section according to a second embodiment.

FIG. 6 is a view showing an example of a voltage control parameter management section 30C. The voltage control parameter management section 30C is provided in a memory 30 in place of the voltage control parameter management section 30B.

As shown in FIG. 6, in the voltage control parameter management section 30C, an item of preceding setting time at the time of write/read continuous with each zone is provided for each of the zones 0 to 9 together with the items of mode, zone, frequency, and voltage control parameter (target DRO count). Here, the preceding setting time implies, more specifically, when the zone from/to which data is read/written is switched from the inner circumferential side to the outer circumferential side, if the seek time is insufficient for the time needed to complete the switchover of the VDD voltage, the time necessary for voltage correction to start switching of the voltage value in advance. It should be noted that in this embodiment, although the case where the preceding setting time is managed at all times whenever the zone is switched from the inner circumferential side to the outer circumferential side will be described, it is sufficient if the preceding setting time of the case where the time for the seek operation is insufficient for the time to change the VDD voltage at least when the zone is switched from one zone to another is managed. Further, regarding mode, zone, frequency, and voltage control parameter (target DRO count value), these are identical to the case of the already-described voltage control parameter management section 30B, and hence descriptions of these items are omitted.

Regarding the preceding setting time for each zone, when the preceding setting time is that of the case of, for example, read/write of data continuous with the zone 0, the preceding setting time becomes shorter when the former zone is farther from the inner circumferential side and closer to the outer circumferential side. More specifically, when the zone is switched from the zone 9 to the zone 0, the preceding setting time is 9 msec and, when the zone is switched from the zone 1 to the zone 0, the preceding setting time is 1 msec. It should be noted that the preceding setting time lengths shown in FIG. 6 are only examples.

Figure 7:
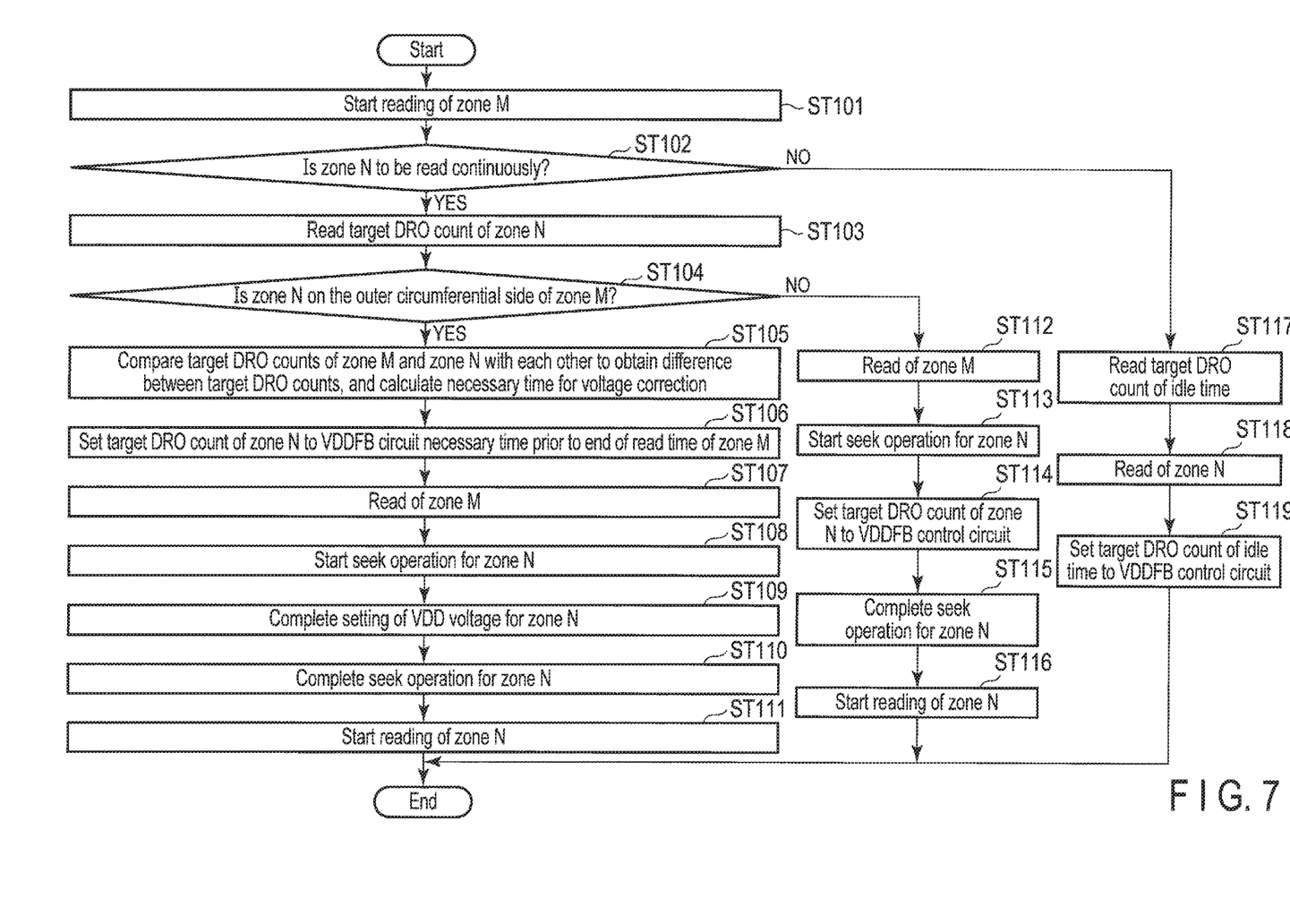
FIG. 7 is a flowchart showing an example of setting processing of a voltage control parameter according to the second embodiment.

Next, the setting processing of the target DRO count to be carried out when data is read will be described below. FIG. 7 is a flowchart showing an example of setting processing of the target DRO count to be carried out by the CPU 11. It should be noted that M and N used in the following description indicate arbitrary numbers of zones. Further, when data is written too, processing identical to data read is carried out, and hence in this embodiment, the case where data is read will be described. It should be noted that this processing is executed by the CPU 11 by reading the voltage control program stored in the voltage control program storage section 30A.

As shown in FIG. 7, the CPU 11 starts reading of the zone M (ST101). Next, the CPU 11 determines whether or not the zone N should be read (ST102). Upon determination that the zone N should be read (ST102: YES), i.e., when data read to be carried out in a random manner is continued, the CPU 11 reads the target DRO count of the zone N (ST103).

Next, the CPU 11 determines whether or not the zone N is on the outer circumferential side of the zone M (ST104). Upon determination that the zone N is on the outer circumferential side of the zone M (ST104: YES), the CPU 11 compares the target DRO counts of the zone M and zone N with each other to obtain a difference between the target DRO counts, and calculates the necessary time for voltage correction (ST105). This necessary time is calculated from the preceding setting time of each of the zone M and zone N managed by the voltage control parameter management section 30C.

Next, the CPU 11 sets the target DRO count of the zone N to the VDDFB control circuit 13 the necessary time prior to the end of the read time of the zone M (ST106). Then, when read of the zone M is completed (ST107), the CPU 11 starts the seek operation for the zone N (ST108). Next, the CPU 11 completes the setting of the VDD voltage of the zone N (ST109) and, at the same time, completes the seek operation for the zone N (ST110). Then, the CPU 11 starts reading of the zone N (ST111).

Further, upon determination in step ST104 that the zone N is not on the outer circumferential side of the zone M (ST104: NO), and upon completion of read of the zone M (ST112), the CPU 11 starts the seek operation for the zone N (ST113), and sets the target DRO count of the zone N to the VDDFB control circuit 13 (ST114). Then, upon completion of the seek operation for the zone N (ST115), the CPU 11 starts reading of the zone N (ST116).

On the other hand, upon determination in step ST102 that the zone N is not to be continuously read (ST102: NO), the CPU 11 reads the target DRO count of the idle time (ST117) and, upon completion of read of the zone N (ST118), the CPU 11 sets the target DRO count of the idle time to the VDDFB control circuit 13 (ST119). Thereby, setting of the VDD voltage for the idle time is completed.

Figure 8:
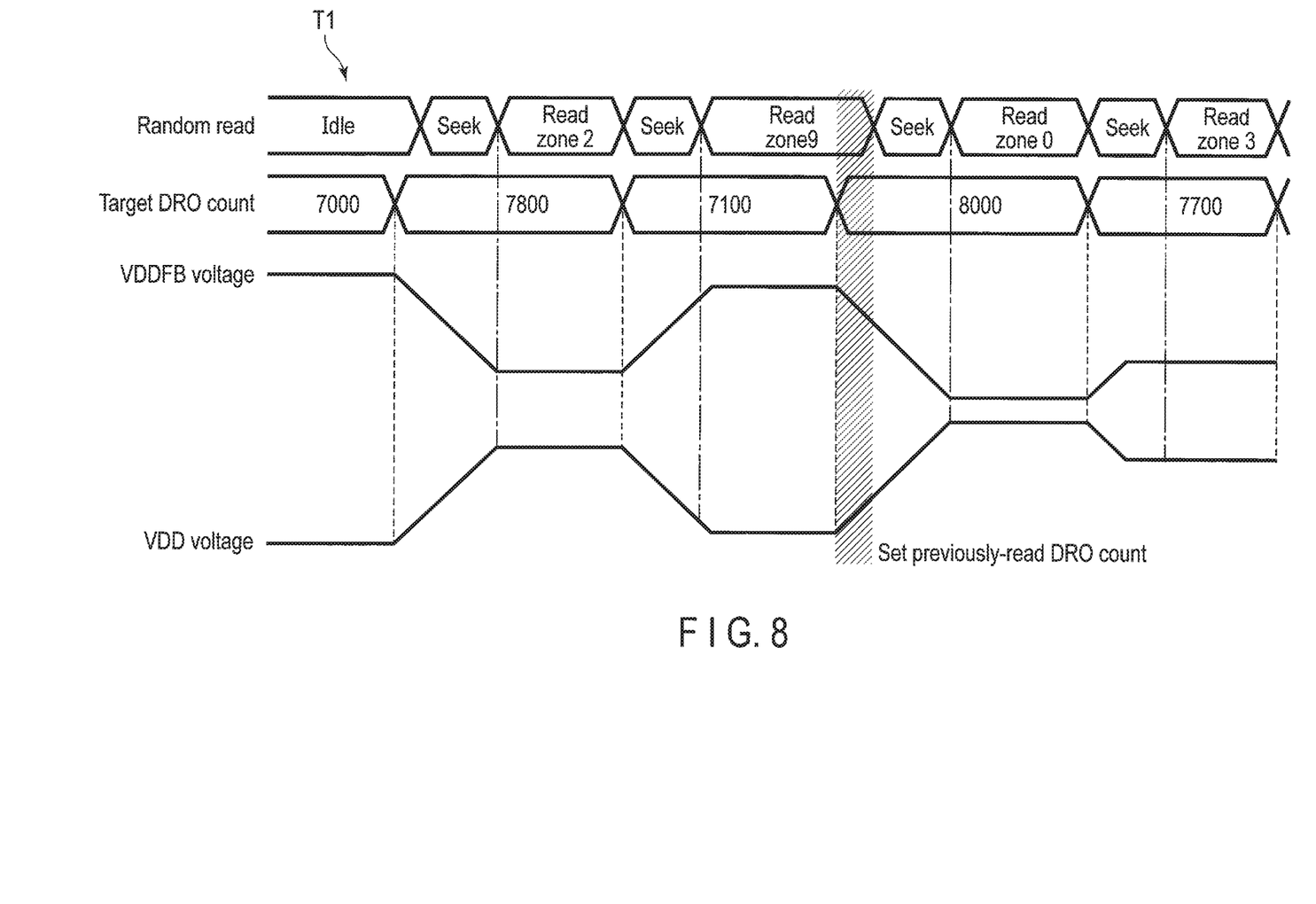
FIG. 8 is a view showing an example of a function of a case where data is read in a random manner from zones set on the magnetic disk according to the second embodiment.

FIG. 8 is a view showing an example of a function of a case where data is read in a random manner from zones set on the magnetic disk 40. It should be noted that the description of the function at the time when data is written is identical to the function at the time when data is read, and hence in this embodiment, a description will be given of the function at the time when data is read.

As shown in FIG. 8, in this embodiment, the case where data is read in a random manner from the zone 2, zone 9, zone 0, and zone 3 in the order mentioned is shown. In this embodiment, when the zone to be read is switched from the inner circumferential side to the outer circumferential side (ST104: YES), the processing from already-described steps ST105 to ST111 is executed, and hence a description will be given by taking the timing at which the zone to be read is switched from the zone 9 to the zone 0 as an example. In this case, the necessary time calculated from the preceding setting time set to the voltage control parameter management section 30C becomes 9 msec. Accordingly, the target DR count is set to the VDDFB control circuit 13 as the previously-read DRO count the necessary time (i.e., 9 msec:

shaded part shown in FIG. 8) prior to the end of the read time of the zone 9, i.e., the time at which the seek operation is started.

Thereby, it is possible for the Soc 10 to exert the advantage identical to the first embodiment, calculate the necessary time for voltage correction before read/write of the preceding zone is completed, and set the target DRO count in advance to the VDDFB control circuit 13 in consideration of the necessary time. Accordingly, in the case of the VDD voltage ascent where the zone is switched from the inner circumferential side to the outer circumferential side, it is possible to prevent both the possibility of the VDD voltage becoming insufficient, and possibility of the transfer rate of data becoming insufficient from occurring.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head configured to carry out read/write from/to the magnetic disk;
   a control device configured to control the magnetic head; and
   a regulator configured to supply voltage to the control device, wherein
   the control device comprises a power source control section configured to change an output voltage value of a voltage supplied to the control device from the regulator on the basis of a voltage control parameter and a control section configured to, when the magnetic head makes access to a zone set on the magnetic disk, set a voltage control parameter provided in such a manner as to be correspondent to the zone to the power source control section,
   the control section carries out feedback control of the regulator such that a value of the voltage supplied from the regulator becomes a target voltage value and starts the feedback control a predetermined time earlier when a position from/to which the magnetic head reads/writes data is switched from an inner circumferential side to an outer circumferential side and if a first time until switching of the voltage of the regulator by the feedback control is completed is larger than a second time until moving of the magnetic head is completed.

2. The magnetic disk device of claim 1, further comprising a memory to which the predetermined time is set according to a zone set on the magnetic disk, wherein
   the control device sets the predetermined time to the zone to which the magnetic head moves with reference to the memory if the first time is less than the second time.

3. The magnetic disk device of claim 2, wherein the predetermined time set according to the zone decreases from the inner peripheral side to the outer peripheral side if the read/write is carried out continuously from the zone on the inner peripheral side of the magnetic disk to the zone on the outer peripheral side of the magnetic disk.

* * * * *